United States Patent
Mano et al.

(10) Patent No.: US 11,769,963 B2
(45) Date of Patent: Sep. 26, 2023

(54) METHOD OF MANUFACTURING WIRE WITH TERMINAL

(71) Applicant: Yazaki Corporation, Tokyo (JP)

(72) Inventors: Kazuki Mano, Shizuoka (JP); Kenji Osada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 49 days.

(21) Appl. No.: 17/511,678

(22) Filed: Oct. 27, 2021

(65) Prior Publication Data

US 2022/0131311 A1 Apr. 28, 2022

(30) Foreign Application Priority Data

Oct. 28, 2020 (JP) .................................. 2020-180516

(51) Int. Cl.
*H01R 13/52* (2006.01)
*B29C 35/08* (2006.01)

(52) U.S. Cl.
CPC ..... *H01R 13/5216* (2013.01); *B29C 35/0888* (2013.01); *Y10T 29/49171* (2015.01)

(58) Field of Classification Search
CPC .. B29C 35/0888; H01R 13/5216; H01R 43/04
See application file for complete search history.

(56) References Cited

U.S. PATENT DOCUMENTS

| 6,796,781 B2* | 9/2004 | Kondo .............. B29C 45/14467 425/436 RM |
| 7,954,235 B2* | 6/2011 | Martauz ................. H01R 4/184 29/857 |
| 9,437,598 B2* | 9/2016 | Ogawa .............. H01L 27/11521 |
| 2012/0199391 A1 | 8/2012 | Inoue et al. |
| 2016/0308301 A1 | 10/2016 | Mano |
| 2022/0131311 A1* | 4/2022 | Mano .................. B29C 35/0888 |

FOREIGN PATENT DOCUMENTS

| JP | 10-76528 A | 3/1998 |
| JP | 2011-103266 A | 5/2011 |
| JP | 2016-204476 A | 12/2016 |
| JP | 2020-35525 A | 3/2020 |

* cited by examiner

*Primary Examiner* — Minh N Trinh
(74) *Attorney, Agent, or Firm* — Sughrue Mion, PLLC

(57) ABSTRACT

Provided is a method of manufacturing a wire with a terminal, the wire with a terminal including a wire, a metal terminal, and a sealing member obtained by curing an anti-corrosive material, the method using a manufacturing apparatus for the wire with a terminal including a transparent mold including a cavity portion, and a protruding portion that protrudes into the cavity portion, the method including an introducing step of placing, in the cavity portion, a non-sealed wire with a terminal before including the sealing member including the wire and the metal terminal, and introducing the anti-corrosive material into the cavity portion; and an irradiating step of irradiating the anti-corrosive material in the cavity portion with ultraviolet light through the transparent mold.

2 Claims, 5 Drawing Sheets

METHOD OF MANUFACTURING WIRE WITH TERMINAL

CROSS REFERENCE TO RELATED APPLICATION

The present application is based on, and claims priority from the prior Japanese Patent Application No. 2020-180516, filed on Oct. 28, 2020, the entire contents of which are incorporated herein by reference.

TECHNICAL FIELD

The present disclosure relates to a method of manufacturing a wire with a terminal.

BACKGROUND

In recent years, use of aluminum in a coated wire constituting a wire harnesses has been increasing to reduce a weight of a vehicle and thus increase the fuel efficiency of the vehicle. A metal terminal to be connected to such a coated wire is usually formed of copper or a copper alloy having excellent electrical properties. However, when different materials are used for a conductor of the coated wire and the metal terminal, corrosion of a joint between the conductor and the metal terminal is easily caused. Thus, an anti-corrosive material is required to prevent corrosion of the joint.

Patent Literature 1 (Japanese Unexamined Patent Application Publication No. 2011-103266) discloses a coated wire with a terminal formed of an anti-corrosive material containing a thermoplastic polyamide resin as a main component, and having a tensile shear strength of 6 N/mm² or greater for a bundle of aluminum, an elongation rate of 100% or greater, and a moisture absorbing rate of 1.0% or less. A thermoplastic polyamide resin has a relatively long curing time, and hence an attention has been paid to a ultraviolet curable resin that requires only a short-term curing processing. The ultraviolet curable resin is cured instantaneously through irradiation with ultraviolet light, and a washing step or a drying step is not required. Thus, subsequent steps can be performed immediately, and the process can be shortened. According to Patent Literature 1, the anti-corrosive material having high fluidity is applied to a joint part between a wire conductor and a metal terminal metal, thereby obtaining a coated wire including a sealing member obtained by curing the anti-corrosive material.

SUMMARY

However, in a case of the coated wire with a terminal disclosed in Patent Literature 1, the anti-corrosive material having high fluidity is applied to a joint part between a wire conductor and a metal terminal, and is cured. In this manner, a sealing member is obtained. Thus, the method of manufacturing a coated wire with a terminal disclosed in Patent Literature 1 has difficulties in controlling flowing and curing of the anti-corrosive material and forming the sealing member into a specific shape, which are problematic.

Note that it is conceivable to use a mold to form the sealing member into a specific shape. However, the coated wire with a terminal has a complex shape. Thus, when the anti-corrosive material having high fluidity is placed into a mold, there may be a risk that the anti-corrosive material flows into a part such as a contact portion of the terminal where formation of the sealing member is not required, and this causes a problem.

The present disclosure has been achieved in view of the above-mentioned problem in such a related-art. The present disclosure has an object to provide a method of manufacturing a wire with a terminal in which a sealing member having a specific shape is formed only in a required part.

A method of manufacturing a wire with a terminal according to an embodiment, is a method of manufacturing a wire with a terminal including a wire including a conductor and a wire covering member configured to cover the conductor, a metal terminal connected to the conductor of the wire, and a sealing member configured to cover a joint between the conductor and the metal terminal, the sealing member being formed by curing an anti-corrosive material, the anti-corrosive material including an ultraviolet curable resin including a polymerizable compound including at least one of a photopolymerizable (meth)acrylate monomer or a photopolymerizable (meth)acrylate oligomer, the polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups, the method using a manufacturing apparatus for the wire with a terminal, the manufacturing apparatus including a transparent mold including a cavity portion formed by overlapping a first transparent mold member and a second transparent mold member with each other, the cavity portion configured to accommodate the joint therein and allow the anti-corrosive material to be introduced thereinto; and a protruding portion that protrudes from the transparent mold into the cavity portion and restricts flowing of the anti-corrosive material, the method including an introducing step of placing, in the cavity portion, a non-sealed wire with a terminal including the wire and the metal terminal and not including the sealing member, and introducing the anti-corrosive material into the cavity portion under a state in which the protruding portion protrudes into the cavity portion, and an irradiating step of irradiating the anti-corrosive material in the cavity portion with ultraviolet light through the transparent mold.

According to the above-mentioned configuration, there can be provided the method of manufacturing a wire with a terminal in which a sealing member having a specific shape is formed only in a required part.

DETAILED DESCRIPTION

Figure 1:
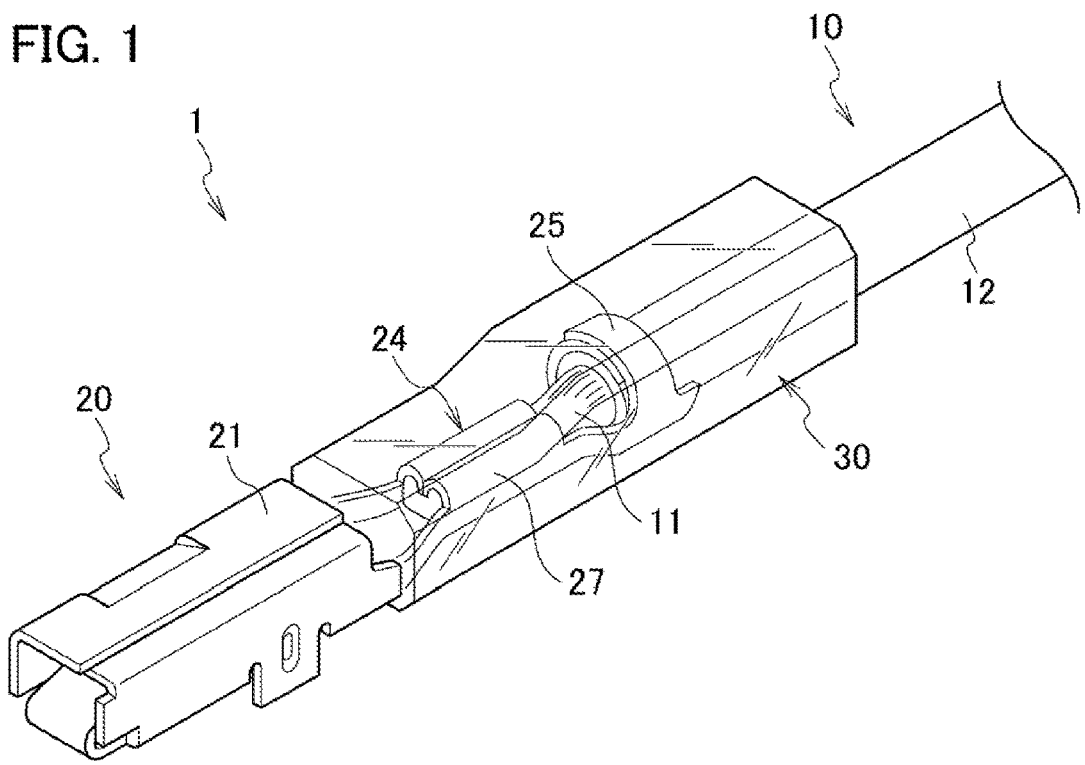
FIG. 1 is a schematic view illustrating a wire with a terminal obtained by a manufacturing method according to the present embodiment.

Various embodiments will be described hereinafter with reference to the accompanying drawings.

Now, with reference to the drawings, a method of manufacturing a wire with a terminal, a wire with a terminal obtained by the manufacturing method, and a wire harness using the wire with a terminal according to the present embodiment are described. Note that dimensional ratios in the drawings are overdrawn for convenience of description, and may be different from actual dimensional ratios in some cases. First, an anti-corrosive material used in the method of manufacturing the wire with a terminal is described. Note that the method of manufacturing a wire with a terminal uses a manufacturing apparatus 100 for a wire with a terminal 1 described later. Thus, in the following description on an anti-corrosive material, the manufacturing apparatus 100 described later is also mentioned as required.

[Anti-Corrosive Material]

Figure 6:
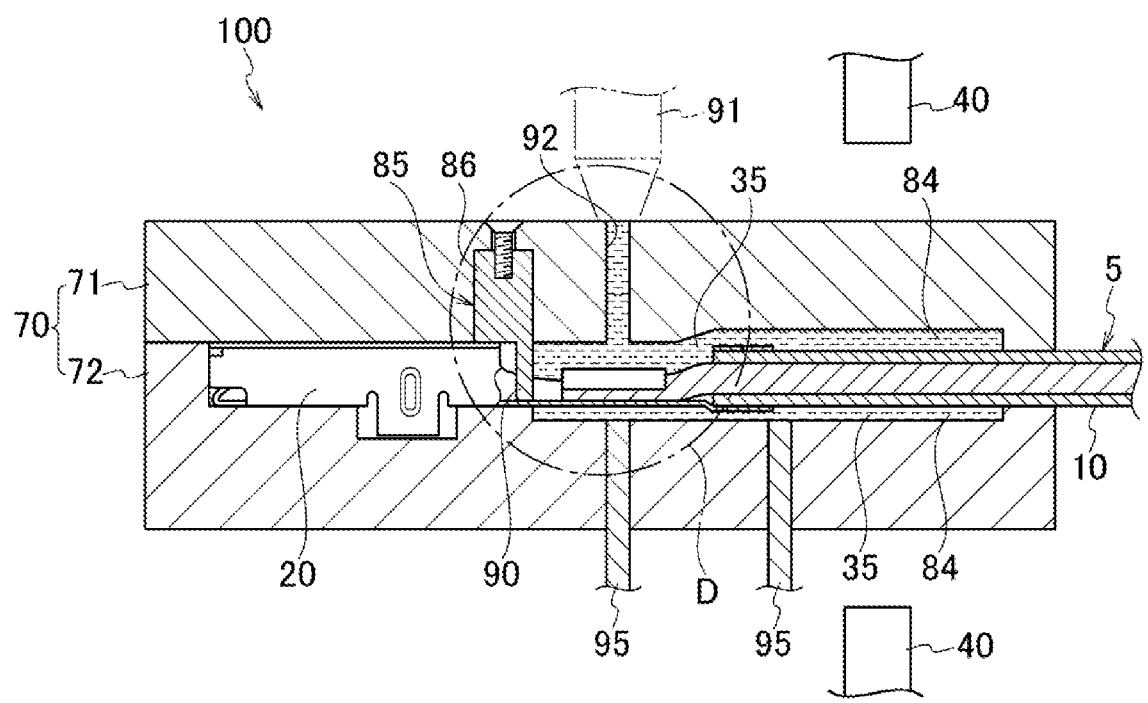
FIG. 6 is a cross-sectional view of the manufacturing apparatus for the wire with a terminal at the time of injecting an anti-corrosive material.
Figure 8:
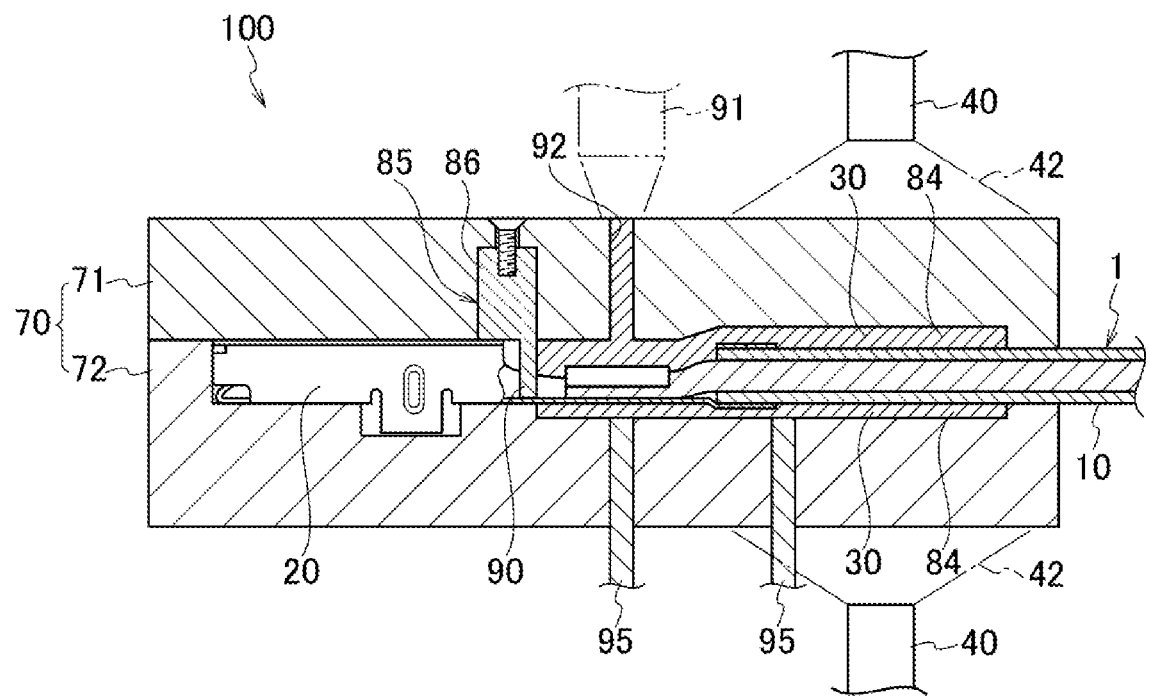
FIG. 8 is a cross-sectional view of the manufacturing apparatus for the wire with a terminal at the time of irradiation with ultraviolet light.

An anti-corrosive material 35, which is used in the method of manufacturing a wire with a terminal and is illustrated in FIG. 6, is cured to form a sealing member 30 that covers a joint 60 constituted of different metal parts, which is illustrated in FIG. 8. The sealing member 30 prevents corroding substances from entering the inside of the joint 60, and thus prevents corrosion of the joint 60 for a long time period. Further, the anti-corrosive material 35 contains an ultraviolet curable resin.

Examples of the ultraviolet curable resin include a polymerizable compound including at least one of a photopolymerizable (meth)acrylate monomer or a photopolymerizable (meth)acrylate oligomer. Here, the photopolymerizable (meth)acrylate monomer and the photopolymerizable (meth)acrylate oligomer indicates a monomer and oligomer having a functional group having a carbon-carbon unsaturated bond, respectively. The ultraviolet curable resin at least contains a polymerizable compound, and contains a photopolymerization initiator and the like as required.

The ultraviolet curable resin preferably contains a polymerizable compound including a photopolymerizable (meth) acrylate monomer. Further, the ultraviolet curable resin preferably contains a polymerizable compound including both a photopolymerizable (meth)acrylate monomer and a photopolymerizable (meth)acrylate oligomer. When the anti-corrosive material containing the ultraviolet curable resin is used, a sealing member obtained by curing the resin has a high adhesive force, and has excellent weather resistance and impact resistance. Thus, when the anti-corrosive material containing the ultraviolet curable resin is used, corrosion of the joint can be prevented effectively.

(Photopolymerizable (Meth)Acrylate Monomer)

Usable photopolymerizable (meth)acrylate monomers constituting the polymerizable compound are a monofunctional (meth)acrylate monomer, a bifunctional (meth)acrylate monomer, a trifunctional (meth)acrylate monomer, and a polyfunctional (meth)acrylate monomer. Here, the monofunctional (meth)acrylate monomer is a (meth)acrylate monomer having one functional group having a carbon-carbon unsaturated bond. The bifunctional (meth)acrylate monomer is a (meth)acrylate monomer having two functional groups. The trifunctional (meth)acrylate monomer is a (meth)acrylate monomer having three functional groups. The polyfunctional (meth)acrylate monomer is a (meth)acrylate monomer having four or more functional groups. Note that, in the polymerizable compound constituting the anti-corrosive material according to the present embodiment, the above-mentioned photopolymerizable (meth)acrylate monomers are used in a certain combination. The certain combination of the photopolymerizable (meth)acrylate monomers is described later.

(Photopolymerizable (Meth)Acrylate Oligomer)

Usable photopolymerizable (meth)acrylate oligomers are a monofunctional (meth)acrylate oligomer, a bifunctional (meth)acrylate oligomer, a trifunctional (meth)acrylate oligomer, and a polyfunctional (meth)acrylate oligomer. Here, the monofunctional (meth)acrylate oligomer is a (meth)acrylate oligomer having one functional group having a carbon-carbon unsaturated bond. The bifunctional (meth)acrylate oligomer is a (meth)acrylate oligomer having two functional groups. The trifunctional (meth)acrylate oligomer is a (meth)acrylate oligomer having three functional groups. The polyfunctional (meth)acrylate oligomer is a (meth)acrylate oligomer having four or more functional groups.

(Combination of Photopolymerizable (Meth)Acrylate Monomers)

Note that, when only at least one of a trifunctional (meth)acrylate monomer or a polyfunctional (meth)acrylate monomer is used as the monomer contained in the ultraviolet curable resin, a cross linking density of a cured object obtained from the ultraviolet curable resin tends to increase. The cured object obtained from the ultraviolet curable resin having an extremely high cross linking density has improved strength and hardness, and also has high surface curability (tackiness). However, the cured object has reduced elongation and depth curability, and the cured object to be obtained is likely to peel off. For this reason, a sealing member using the cured object obtained from the ultraviolet curable resin having an extremely high cross linking density makes it difficult to prevent corrosion for a long time period.

Thus, the photopolymerizable (meth)acrylate monomers constituting the polymerizable compound used in the present embodiment are the plurality of kinds of the (meth)acrylate monomers used in a certain combination. Specifically, the polymerizable compound used in the present embodiment contains a first combination or a second combination of the plurality kinds of the (meth)acrylate monomers. The first combination is a combination of the monofunctional (meth) acrylate monomer and the bifunctional (meth)acrylate monomer. The second combination is a combination of at least one of the monofunctional (meth)acrylate monomer or the bifunctional (meth)acrylate monomer and at least one of the trifunctional (meth)acrylate monomer or the polyfunctional (meth)acrylate monomer having four or more functional groups.

In the first combination and the second combination, a (meth)acrylate compound having a small number of functional groups and a (meth)acrylate compound having a large number of functional groups are mixed instead of using only a polyfunctional (meth)acrylate monomer having three or more functional groups. With this, in the sealing member according to the present embodiment, the cross linking density of the cured object obtained from the ultraviolet curable resin can be prevented from increasing excessively. For this reason, the sealing member according to the present embodiment can have improved elongation and depth curability in addition to strength, hardness, and surface curability. As a result, the sealing member can be prevented from peeling off at the joint formed of different materials, and can prevent corrosion of the joint for a long time period. Here, depth curability is an index indicating a depth at which the resin is cured when being irradiated with light from above. Further, throughout the specification, the term "(meth)acrylate" includes both acrylate and methacrylate.

The photopolymerizable (meth)acrylate monomer and the photopolymerizable (meth)acrylate oligomer are specifically described below.

(Monofunctional Acrylate Monomer)

Usable monofunctional acrylate monomers are compounds represented by Chemical Formula 1. Specific examples thereof include ethoxylated o-phenylphenol acrylate (see Formula (a), viscosity: 150 mPa·s at a temperature of 25° C.), methoxypolyethylene glycol 400 acrylate (see Formula (b), where n=9, viscosity: 28 mPa·s at a temperature of 25° C.), methoxypolyethylene glycol 550 acrylate (see Formula (b), where n=13), phenoxypolyethylene glycol acrylate (see Formula (c), viscosity: 16 mPa·s at a temperature of 25° C.), 2-acryloyloxyethyl succinate (see Formula (d), viscosity: 180 mPa·s at a temperature of 25° C.), and isostearyl acrylate (see Formula (e), viscosity: 18 mPa·s at a temperature of 25° C.) produced by Shin Nakamura Chemical Co., Ltd. Further, other examples of the monofunctional acrylate monomer include β-carboxyethyl acrylate (viscosity: 75 mPa·s at a temperature of 25° C.), isobornyl acrylate (viscosity: 9.5 mPa·s at a temperature of 25° C.), octyl/decyl acrylate (viscosity: 3 mPa·s at a temperature of 25° C.), ethoxylated phenyl acrylate (EO: 2 mol) (viscosity: 20 mPa·s at a temperature of 25° C.), and ethoxylated phenyl acrylate (EO: 1 mol) (viscosity: 10 mPa·s at a temperature of 25° C.) produced by DAICEL-ALLNEX LTD.

[Chem. 1]

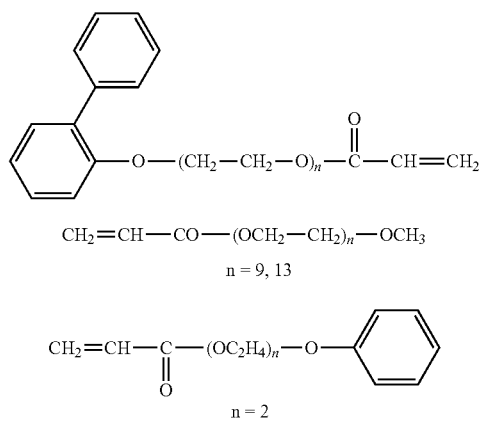

(a)

(b)

$CH_2=CH-CO-(OCH_2-CH_2)_n-OCH_3$ n = 9, 13

(c)

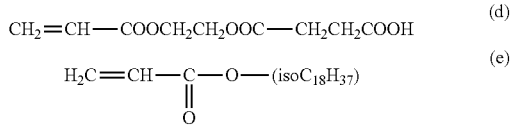

n = 2

[Chem. 2-1]

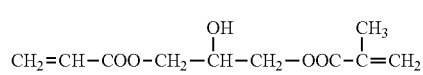

(a)

-continued (d)

$CH_2=CH-COOCH_2CH_2OOC-CH_2CH_2COOH$ (e)

$H_2C=CH-\underset{\underset{O}{\|}}{C}-O-(isoC_{18}H_{37})$ (Bifunctional Acrylate Monomer)

Usable bifunctional acrylate monomers are compounds represented by Chemical Formula 2-1 to Chemical Formula 2-3. Specific example thereof include 2-hydroxy-3-(acryloyloxy)propyl methacrylate (see Formula (a), viscosity: 44 mPa·s at a temperature of 25° C.), polyethylene glycol 200 diacrylate (see Formula (b), n=4, viscosity: 22 mPa·s at a temperature of 25° C.), polyethylene glycol 400 diacrylate (see Formula (b), n=9, viscosity: 58 mPa·s at a temperature of 25° C.), polyethylene glycol 600 diacrylate (see Formula (b), n=14, viscosity: 106 mPa·s at a temperature of 25° C.), polyethylene glycol 1000 diacrylate (see Formula (b), n=23, viscosity: 100 mPa·s at a temperature of 40° C.), propoxylated ethoxylated bisphenol A diacrylate (see Formula (c), viscosity: 500 mPa·s at a temperature of 25° C.), ethoxylated bisphenol A diacrylate (see Formula (d), viscosity: 1500 mPa·s at a temperature of 25° C.), 9,9-bis[4-(2-acryloyloxyethoxy)phenyl]fluorene (see Formula (e), viscosity: 91,000 mPa·s at a temperature of 60° C.), propoxylated bisphenol A diacrylate (see Formula (f), viscosity: 3000 mPa·s at a temperature of 25° C.), tricyclodecane dimethanol diacrylate (see Formula (g), viscosity: 120 mPa·s at a temperature of 25° C.), 1,10-decanediol diacrylate (see Formula (h), viscosity: 10 mPa·s at a temperature of 25° C.), 1,6-hexanediol diacrylate (see Formula (i), viscosity: 8 mPa·s at a temperature of 25° C.), 1,9-nonanediol diacrylate (see Formula (j), viscosity: 8 mPa·s at a temperature of 25° C.), dipropylene glycol diacrylate (see Formula (k), viscosity: 8 mPa·s at a temperature of 25° C.), tripropylene glycol diacrylate (see Formula (l), m+n=3, viscosity: 12 mPa·s at a temperature of 25° C.), polypropylene glycol 400 diacrylate (see Formula (l), m+n=7, viscosity: 34 mPa·s at a temperature of 25° C.), polypropylene glycol 700 diacrylate (see Formula (l), m+n=12, viscosity: 68 mPa·s at a temperature of 25° C.), and polytetramethylene glycol 650 diacrylate (see Formula (m), viscosity: 140 mPa·s at a temperature of 25° C.) produced by Shin Nakamura Chemical Co., Ltd. Further, other examples of the bifunctional acrylate monomer include dipropylene glycol diacrylate (viscosity: 10 mPa·s at a temperature of 25° C.), 1,6-hexanediol diacrylate (viscosity: 6.5 mPa·s at a temperature of 25° C.), tripropylene glycol diacrylate (viscosity: 12.5 mPa·s at a temperature of 25° C.), PO-modified neopentyl glycol diacrylate (viscosity: 20 mPa·s at a temperature of 25° C.), modified bisphenol A diacrylate (viscosity: 1100 mPa·s at a temperature of 25° C.), tricyclodecane dimethanol diacrylate (viscosity: 140 mPa·s at a temperature of 25° C.), PEG 400 diacrylate (viscosity: 60 mPa·s at a temperature of 25° C.), PEG 600 diacrylate (viscosity: 120 mPa·s at a temperature of 25° C.), and neopentyl glycol-hydroxypivalic acid ester diacrylate (viscosity: 25 mPa·s at a temperature of 25° C.) produced by DAICEL-ALLNEX LTD.

-continued

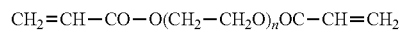
(b)

n = 4, 9, 14, 23

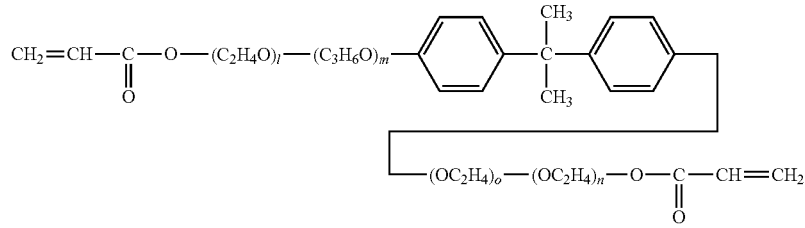
(c)

l + o = 6
m + n = 12

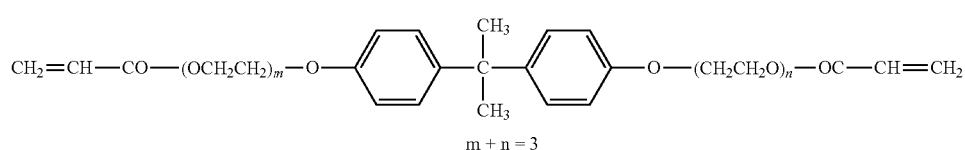
(d)

m + n = 3

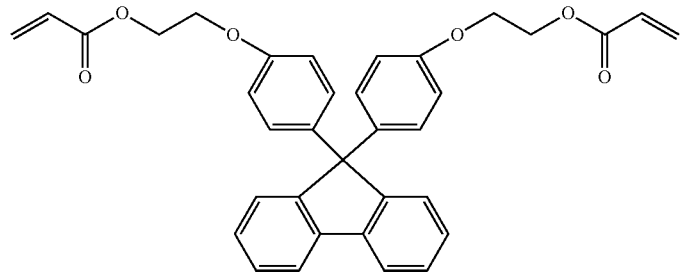
(e)

[Chem. 2-2]

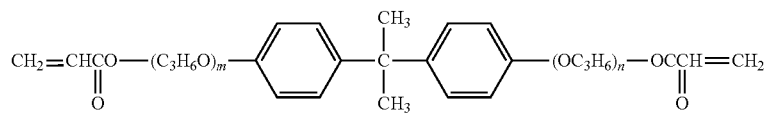
(f)

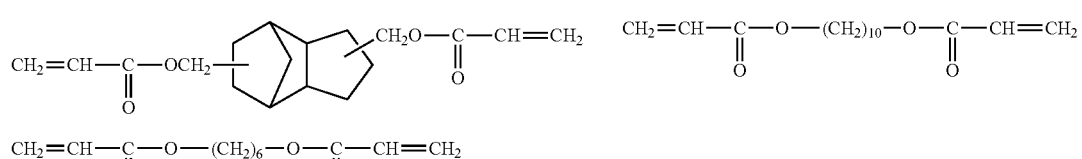
(g) (h)

(i)

[Chem. 2-3]

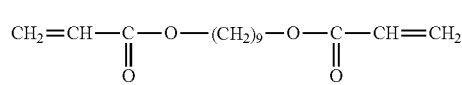
(j) (k)

m + n = 2

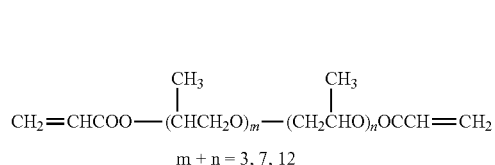
(l) (m)

m + n = 3, 7, 12 n = 9

(Trifunctional Acrylate Monomer and Polyfunctional Acrylate Monomer)

Usable trifunctional acrylate monomers and polyfunctional acrylate monomers are compounds represented by Chemical Formula 3-1 to Chemical Formula 3-2. Specific examples thereof include ethoxylated isocyanuric acid triacrylate (see Formula (a), viscosity: 1,000 mPa·s at a temperature of 50° C.), ε-caprolactone modified tris-(2-acryloxyethyl) isocyanurate (see Formula (b), viscosity: 3,000 to 4,000 mPa·s at a temperature of 25° C.), ethoxylated glycerine triacrylate (EO: 9 mol) (see Formula (c), l+m+n=9, viscosity: 190 mPa·s at a temperature of 25° C.), ethoxylated glycerine triacrylate (EO: 20 mol) (see Formula (c), l+m+n=20, viscosity: 110 mPa·s at a temperature of 25° C.), pentaerythritol triacrylate (triester: 37%) (see Formula (d), viscosity: 790 mPa·s at a temperature of 25° C.), pentaerythritol triacrylate (triester: 55%) (see Formula (d), viscosity: 490 mPa·s at a temperature of 25° C.), pentaerythritol triacrylate (triester: 57%) (see Formula (d), viscosity: 730 mPa·s at a temperature of 25° C.), trimethylolpropane triacrylate (see Formula (e), viscosity: 110 mPa·s at a temperature of 25° C.), ditrimethylolpropane tetraacrylate (see Formula (f), viscosity: 1,000 mPa·s at a temperature of 25° C.), ethoxylated pentaerythritol tetraacrylate (see Formula (g), viscosity: 350 mPa·s at a temperature of 25° C.), pentaerythritol tetraacrylate (see Formula (h), viscosity: 200 mPa·s at a temperature of 40° C.), dipentaerythritol polyacrylate (see Formula (i), viscosity: 6,500 mPa·s at a temperature of 25° C.), and dipentaerythritol hexaacrylate (see Formula (j), viscosity: 6,600 mPa·s at a temperature of 25° C.) produced by Shin Nakamura Chemical Co., Ltd. Further, examples of the polyfunctional acrylate monomer include dipentaerythritol pentaacrylate, phthalic acid monohydroxyethylacrylate, and isocyanuric acid ethylene oxide modified-diacrylate.

[Chem. 3-1]

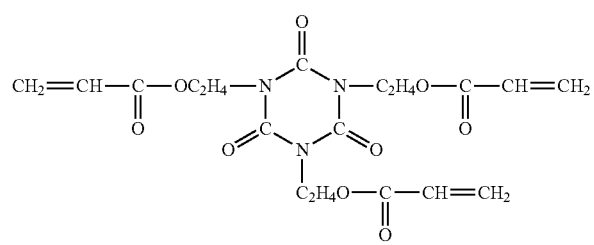

(a)

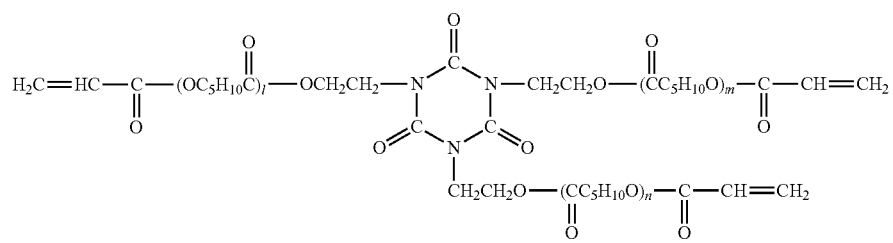

(b)

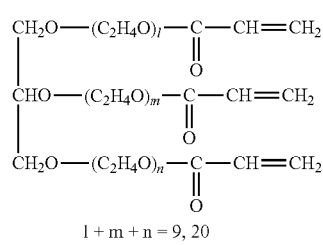

(c)

(d)

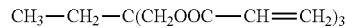

(e)

[Chem. 3-2]

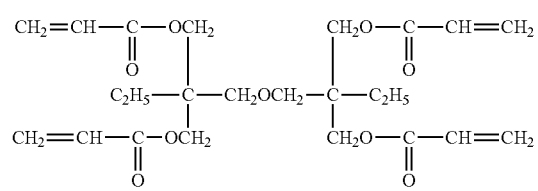

(f)

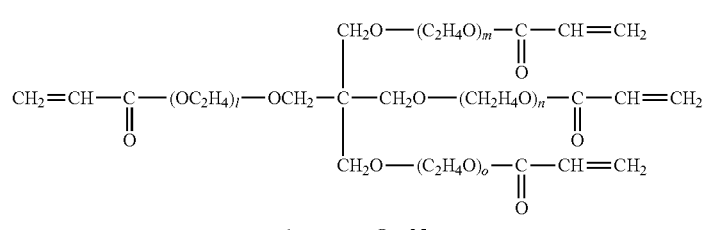

(g)

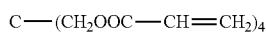 (h)

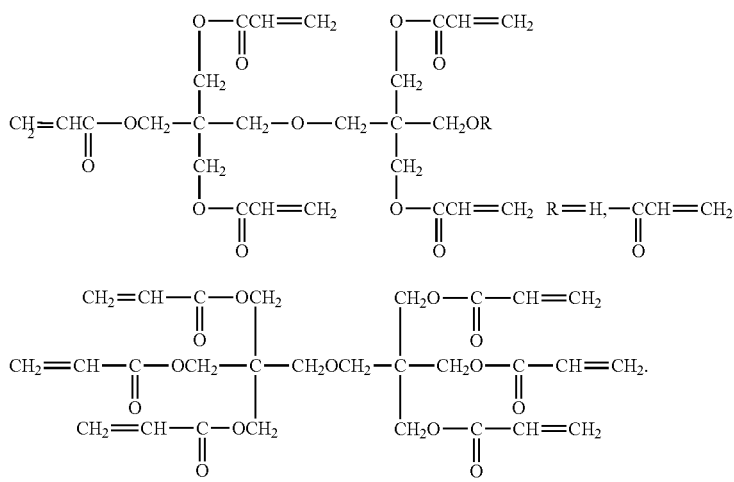

(i)

(j)

Other examples of the trifunctional acrylate monomer include pentaerythritol (tri/tetra) acrylate (viscosity: 1100 mPa·s at a temperature of 25° C.), trimethylolpropane triacrylate (viscosity: 100 mPa·s at a temperature of 25° C.), trimethylolpropane ethoxytriacrylate (viscosity: 60 mPa·s at a temperature of 25° C.), trimethylolpropane propoxytriacrylate (viscosity: 90 mPa·s at a temperature of 25° C.), and glycerin propoxytriacrylate (viscosity: 100 mPa·s at a temperature of 25° C.) produced by DAICEL-ALLNEX LTD. Other examples of the polyfunctional acrylate monomer having four or more functional groups include pentaerythritol ethoxytetraacrylate (viscosity: 160 mPa·s at a temperature of 25° C.), ditrimethylolpropane tetraacrylate (viscosity: 1,000 mPa·s at a temperature of 25° C.), pentaerythritol (tri/tetra) acrylate (viscosity: 700 mPa·s at a temperature of 25° C.), and dipentaerythritol hexaacrylate (viscosity: 6,900 mPa·s at a temperature of 25° C.) produced by DAICEL-ALLNEX LTD.

(Monofunctional Methacrylate Monomer)

Usable monofunctional methacrylate monomers are compounds represented by Chemical Formula 4. Specific examples thereof include 2-methacryloyloxyethyl phthalic acid (see Formula (a), viscosity: 3,400 mPa·s at a temperature of 25° C.), methoxy polyethylene glycol 400 methacrylate (see Formula (b), n=9, viscosity: 23 mPa·s at a temperature of 25° C.), methoxy polyethylene glycol 1000 methacrylate (see Formula (b), n=23, viscosity: 55 mPa·s at a temperature of 40° C.), phenoxy ethylene glycol methacrylate (see Formula (c), viscosity: 7 mPa·s at a temperature of 25° C.), stearyl methacrylate (see Formula (d), viscosity: 8 mPa·s at a temperature of 30° C.), and 2-methacryloyloxyethyl succinate (see Formula (e), viscosity: 160 mPa·s at a temperature of 25° C.) produced by Shin Nakamura Chemical Co., Ltd.

[Chem. 4]

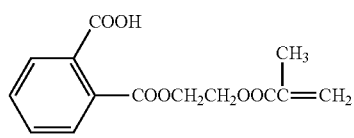 (a)

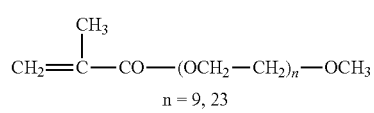 (b)

n = 9, 23

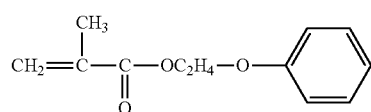 (c)

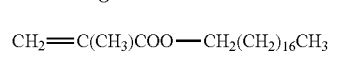 (d)

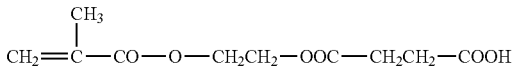 (e)

(Bifunctional Methacrylate Monomer)

Usable bifunctional methacrylate monomers are compounds represented by Chemical Formula 5-1 and Chemical Formula 5-2. Specific examples thereof include ethylene glycol dimethacrylate (see Formula (a), viscosity: 3 mPa·s at a temperature of 25° C.), diethylene glycol dimethacrylate (see Formula (b), n=2, viscosity: 5 mPa·s at a temperature of 25° C.), triethylene glycol dimethacrylate (see Formula (b), n=3, viscosity: 9 mPa·s at a temperature of 25° C.), polyethylene glycol 200 dimethacrylate (see Formula (b), n=4, viscosity: 14 mPa·s at a temperature of 25° C.), polyethylene glycol 400 dimethacrylate (see Formula (b), n=9, viscosity: 35 mPa·s at a temperature of 25° C.), polyethylene glycol 600 dimethacrylate (see Formula (b), n=14, viscosity: 64 mPa·s at a temperature of 25° C.), polyethylene glycol 1000 dimethacrylate (see Formula (b), n=23, viscosity: 80 mPa·s at a temperature of 40° C.), ethoxylated bisphenol A dimethacrylate (see Formula (c), viscosity: 1000 mPa·s at a temperature of 25° C.), tricyclodecane dimethanol dimethacrylate (see Formula (d), viscosity: 100 mPa·s at a temperature of 25° C.), 1,10-decanediol dimethacrylate (see Formula (e), viscosity: 10 mPa·s at a temperature of 25° C.), 1,6-hexanediol dimethacrylate (see Formula (l), viscosity: 6 mPa·s at a temperature of 25° C.), 1,9-nonanediol dimethacrylate (see Formula (g), viscosity: 8 mPa·s at a temperature of 25° C.), neopentyl glycol dimethacrylate (see Formula (h), viscosity: 5 mPa·s at a temperature of 25° C.), ethoxylated polypropylene glycol 700 dimethacrylate (see Formula (i), viscosity: 90 mPa·s at a temperature of 25° C.), glycerin dimethacrylate (see Formula (j), viscosity: 40 mPa·s at a temperature of 25° C.), and polypropylene glycol 400 dimethacrylate (see Formula (k), viscosity: 27 mPa·s at a temperature of 25° C.) produced by Shin Nakamura Chemical Co., Ltd.

(Trifunctional Methacrylate Monomer)

Usable trifunctional methacrylate monomers are compounds represented by Chemical Formula 6. Specific examples thereof include trimethylolpropane trimethacrylate (viscosity: 42 mPa·s at a temperature of 25° C.) produced by Shin Nakamura Chemical Co., Ltd.

[Chem. 5-1]

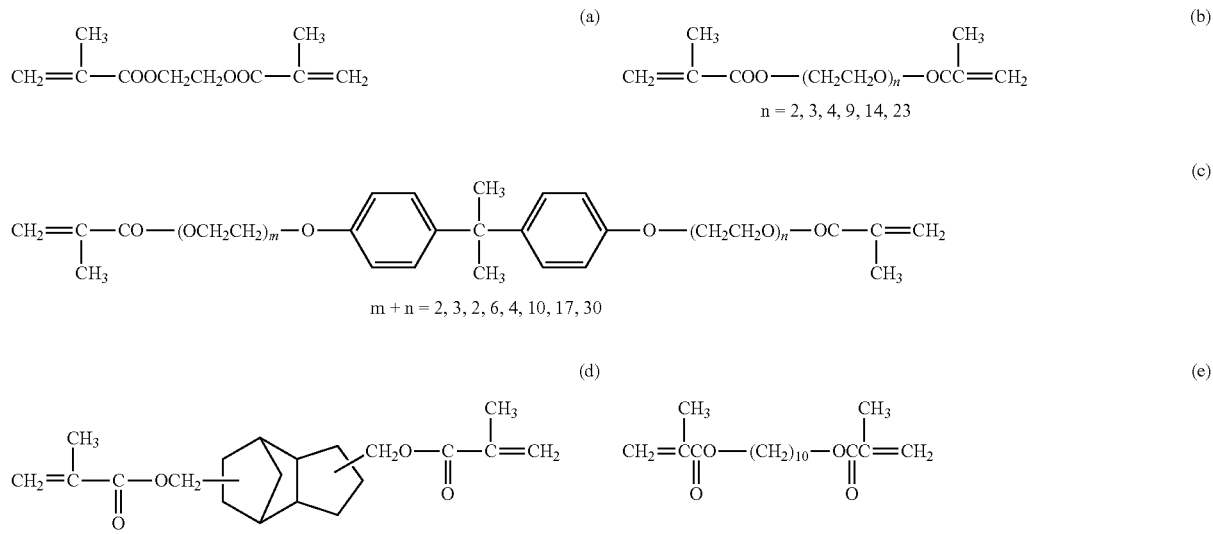

[Chem. 5-2]

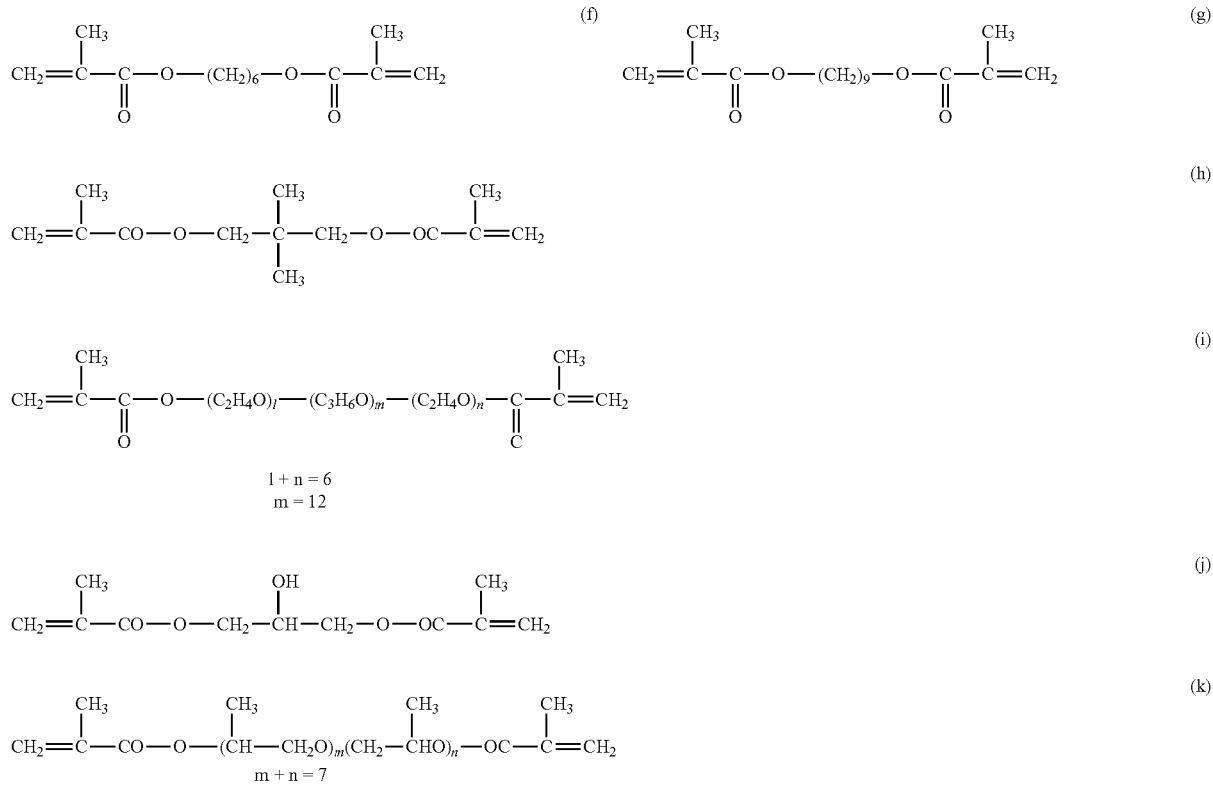

[Chem. 6]

((Meth)Acrylate Oligomer)

Further, usable photopolymerizable (meth)acrylate oligomers are aromatic urethane acrylate, aliphatic urethane acrylate, polyester acrylate, and epoxy acrylate produced by DAICEL-ALLNEX LTD. Examples of the epoxy acrylate include bisphenol A epoxy acrylate, epoxyfied soybean oil acrylate, modified epoxy acrylate, fatty acid-modified epoxy acrylate, and amine-modified bisphenol A epoxy acrylate.

Examples of the photopolymerizable (meth)acrylate oligomer include acrylic acrylate such as polybasic acid-modified acrylic oligomer, and silicone acrylate.

(Monofunctional (Meth)Acrylate Monomer)

Preferred monofunctional (meth)acrylate monomers are isobornyl acrylate and ethoxylated phenylacrylate. Preferred bifunctional (meth)acrylate monomers are 2-hydroxy-3-(acryloyloxy)propyl methacrylate and dipropylene glycol diacrylate. Preferred trifunctional (meth)acrylate monomers are glycerin propoxytriacrylate and trimethylolpropane propoxytriacrylate. Preferred polyfunctional (meth)acrylate monomers having four or more functional groups are pentaerythritol ethoxytetraacrylate and ditrimethylolpropane tetraacrylate.

Note that, in the polymerizable compound of the present embodiment, a mixing ratio of the monofunctional (meth)acrylate monomer, the bifunctional (meth)acrylate monomer, the trifunctional (meth)acrylate monomer, and the polyfunctional (meth)acrylate monomer having four or more functional groups is not limited to Reference Examples and Examples described later, and may be set in a freely-selective manner so as to obtain effects of the present embodiment.

The ultraviolet curable resin according to the present embodiment preferably contains a photopolymerization initiator for accelerating ultraviolet light curing, in addition to the above-mentioned polymerizable compound. The photopolymerization initiator is a compound that initiates a polymerization reaction of the photopolymerizable monomer or the photopolymerizable oligomer. The photopolymerization initiator is a substance that absorbs a light component having a specific wavelength from ultraviolet light, is excited, and then generates radicals.

For example, at least one kind selected from a group consisting of a benzoin ether-based photopolymerization initiator, a ketal-based photopolymerization initiator, an acetophenone-based photopolymerization initiator, a benzophenone-based photopolymerization initiator, and a thioxanthone-based photopolymerization initiator may be used as the photopolymerization initiator. Note that those photopolymerization initiators are merely examples, and the present embodiment is not limited thereto. Specifically, various kinds of photopolymerization initiators may be used in accordance with purposes.

The ultraviolet curable resin according to the present embodiment contains the above-mentioned polymerizable compound as a main component. Further, the ultraviolet curable resin according to the present embodiment may contain other monomers and oligomers in addition to the above-mentioned polymerizable compound. Moreover, the ultraviolet curable resin may contain at least one of the additives listed below. Usable additives include photopolymerization initiating assistant agents, anti-adhesive agents, fillers, plasticizers, non-reactive polymers, coloring agents, flame retardants, flame retardant assistant agents, anti-softening agents, mold release agents, desiccants, dispersants, wetting agents, anti-settling agents, thickeners, anti-electrification agents, antistatic agents, matting agents, antiblocking agents, anti-skinning agents, and surfactants.

As described above, the anti-corrosive material according to the present embodiment contains the above-mentioned ultraviolet curable resin. For this reason, the anti-corrosive material is cured instantaneously through irradiation with ultraviolet light, and a washing step or a drying step is not required. Thus, subsequent steps can be performed immediately, and the process can be shortened. Note that, when the ultraviolet curable resin has an excessively high viscosity, there may be a risk that sufficient filling cannot be performed at the time of introducing the anti-corrosive material into a cavity portion 80 of the manufacturing apparatus 100 described later. In this case, there may be a risk that the sealing member obtained by curing the anti-corrosive material has a defective shape. For this reason, when the metal terminal of the wire with a terminal 1 is accommodated in a connector housing, the sealing member cannot be inserted into a cavity of the connector housing. With this, there may be a risk that an existing connector housing cannot be used.

In view of this, the anti-corrosive material according to the present embodiment preferably has a viscosity of 18,900 mPa·s or less, the viscosity being measured at 25° C. according to JIS Z8803 (the method of measuring a viscosity of a liquid). For this reason, a risk that the cavity portion 80 cannot be sufficiently filled with the anti-corrosive material is eliminated, and the sealing member obtained by curing the anti-corrosive material is less likely to have a defect shape. Thus, an existing connector housing can be used. Note that the minimum value of the viscosity of the anti-corrosive material is not particularly limited, and may be set to 300 mPa·s, for example. When the viscosity of the anti-corrosive material is equal to or greater than this value, filling performance of the anti-corrosive material is satisfactory at the time of introducing the anti-corrosive material into the cavity portion 80. Thus, the shape of the sealing member obtained by curing the anti-corrosive material is satisfactory, and anti-corrosive performance can be improved.

Note that the viscosity of the anti-corrosive material changes depending on a viscosity of each of the photopolymerizable (meth)acrylate monomer and the photopolymerizable (meth)acrylate oligomer, and an added amount of each of the monomer and the oligomer. Further, unless the polymerizable compound is irradiated with ultraviolet light to advance a polymerization reaction, the monomers, and the monomers and the oligomers are not polymerized to increase the viscosity of the polymerizable compound. For this reason, the viscosity of the anti-corrosive material, which is obtained by adjusting the viscosity and the added amount of each of the monomer and the oligomer, can be set to 18,900 mPa·s or less.

As described above, the anti-corrosive material according to the present embodiment includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth) acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material preferably has a viscosity of 18,900 mPa·s or less, the viscosity being measured at 25° C. according to JIS Z8803.

In the present embodiment, the ultraviolet curable resin in which the (meth)acrylate monomer having a small number of functional groups and the (meth)acrylate monomer having a large number of functional groups are mixed is used as the anti-corrosive material. For this reason, the cured object to be obtained has an appropriate cross linking density, and hence can have improved elongation in addition to strength, hardness, and surface curability. Further, when the monomer contained in the ultraviolet curable resin is constituted of only a polyfunctional (meth)acrylate monomer having three or more functional groups, depth curability is reduced, the resin in the anti-corrosive material is not sufficiently cured and peels off from the joint, and anti-corrosive performance is reduced in some cases. However, in the present embodiment, the ultraviolet curable resin contains a (meth)acrylate compound having a small number of functional groups. Thus, reduction of depth curability can be suppressed, peeling can be prevented, and anti-corrosive performance can be improved.

Further, the anti-corrosive material has a viscosity that is equal to or lower than a predetermined value. Thus, a risk that the cavity portion 80 cannot be sufficiently filled with the anti-corrosive material is eliminated, and generation of a defect shape of the sealing member obtained by curing the anti-corrosive material can be suppressed. Moreover, the anti-corrosive material is cured instantaneously through irradiation with ultraviolet light, and a washing step or a drying step is not required. Thus, the process can be shortened. Further, in the present embodiment, the anti-corrosive material in a liquid form is introduced into the cavity portion 80, and is irradiated with ultraviolet light and cured. Thus, when the wire and the joint have any shapes, a sealing member excellent in anti-corrosive performance can be formed.

[Wire with Terminal]

Figure 5:
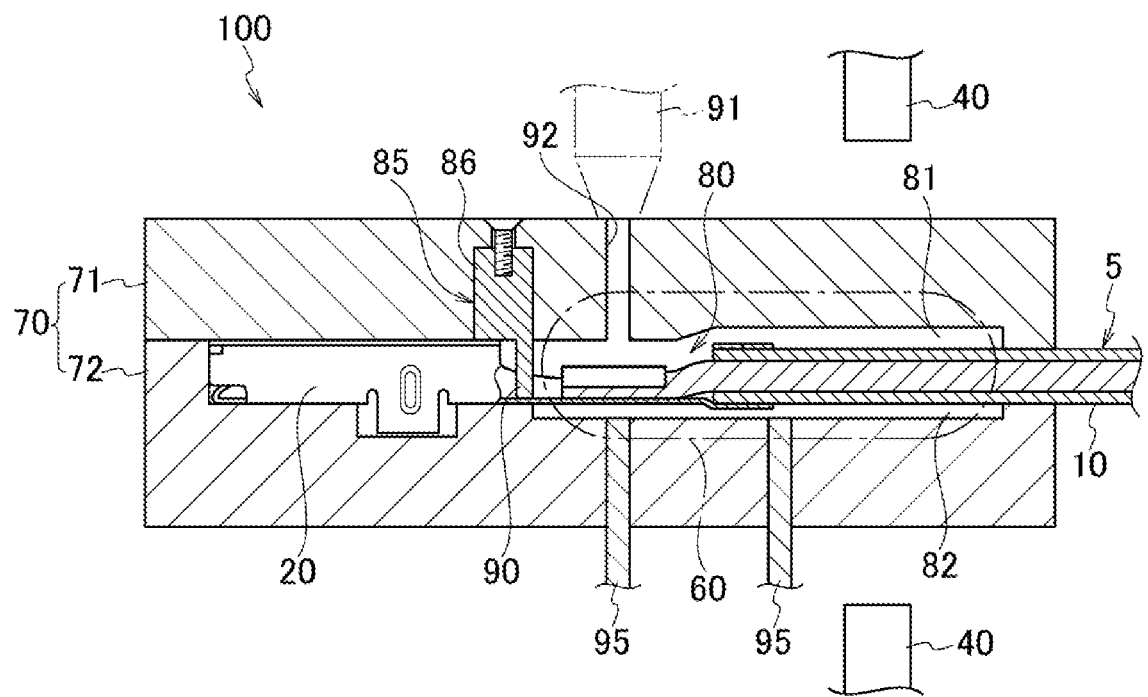
FIG. 5 is a cross-sectional view of the manufacturing apparatus for the wire with a terminal after mold clamping.

Next, a wire with a terminal, which is manufactured by the method of manufacturing a wire with a terminal according to the present embodiment, is described. As illustrated in FIG. 1 and FIG. 5, a wire with a terminal 1 according to the present embodiment includes a wire 10 and a metal terminal 20. The wire 10 includes a conductor 11 having conductivity and a wire covering member 12 configured to cover the conductor 11. The metal terminal 20 is connected to the conductor 11 of the wire 10. Moreover, the wire with a terminal 1 includes a sealing member 30 configured to cover a joint 60 between the conductor 11 and the metal terminal 20, the sealing member 30 being formed by curing the anti-corrosive material 35.

Figure 2:
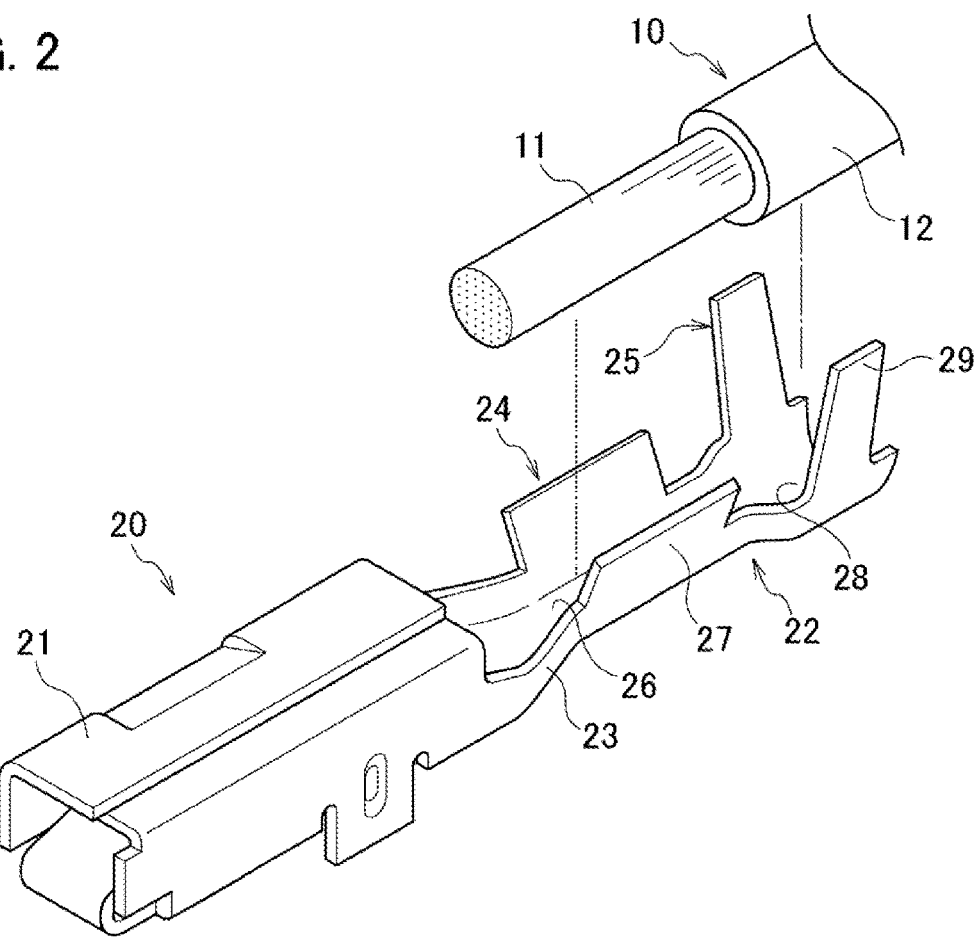
FIG. 2 is a schematic view of the wire with a terminal obtained by the manufacturing method according to the present embodiment for illustrating a state before the wire is connected to a metal terminal.

The metal terminal 20 of the wire with a terminal 1 is a female type. The metal terminal 20 includes an electrical connection portion 21 in the left part of FIG. 1. The electrical connection portion 21 is connected to a mating terminal (not shown). The electrical connection portion 21 has a box-like shape, and includes a built-in spring piece engageable with the mating terminal. Further, a wire connection portion 22 illustrated in FIG. 2 is provided to the electrical connection portion 21 in the right part of FIG. 1, through intermediation of a connection portion 23. The wire connection portion 22 is connected to the terminal portion of the wire 10 by crimping. When the wire connection portion 22 of the metal terminal 20 is connected to the terminal portion of the wire 10, a non-sealed wire with a terminal 5 is obtained. The non-sealed wire with a terminal 5 has the same configuration as that of the wire with a terminal 1 except that the sealing member 30 is not included.

The wire connection portion 22 is described in detail. The wire connection portion 22 includes a conductor press-fitting portion 24 positioned in the left part of FIG. 1 and a covering member crimping portion 25 positioned in the right part of FIG. 1.

The conductor press-fitting portion 24 is brought into direct contact with the conductor 11 that is exposed by removing the wire covering member 12 at the terminal portion of the wire 10, and includes a bottom plate portion 26 and a pair of conductor crimping pieces 27. The pair of conductor crimping pieces 27 are formed to extend upward in FIG. 2 from both lateral sides of the bottom plate portion 26. The pair of conductor crimping pieces 27 are bent inward so as to wrap the conductor 11 of the wire 10, thereby crimping the conductor 11 and the upper surface of the bottom plate portion 26 under a close contact state. With the bottom plate portion 26 and the pair of conductor crimping pieces 27, the conductor press-fitting portion 24 is formed to have a substantially U-like shape in a cross-sectional view.

Further, the covering member crimping portion 25 is brought into direct contact with the wire covering member 12 at the terminal portion of the wire 10, and includes a bottom plate portion 28 and a pair of covering member crimping pieces 29. The pair of covering member crimping pieces 29 extend upward in FIG. 2 from both lateral sides of the bottom plate portion 28, and are bent inward so as to wrap a part having the wire covering member 12, thereby crimping the wire covering member 12 and the upper surface of the bottom plate portion 28 under a close contact state. With the bottom plate portion 28 and the pair of covering member crimping pieces 29, the covering member crimping portion 25 is formed to have a substantially U-like shape in a cross-sectional view. Note that a common base plate portion is formed continuously from the bottom plate portion 26 of the conductor press-fitting portion 24 to the bottom plate portion 28 of the covering member crimping portion 25.

Figure 3:
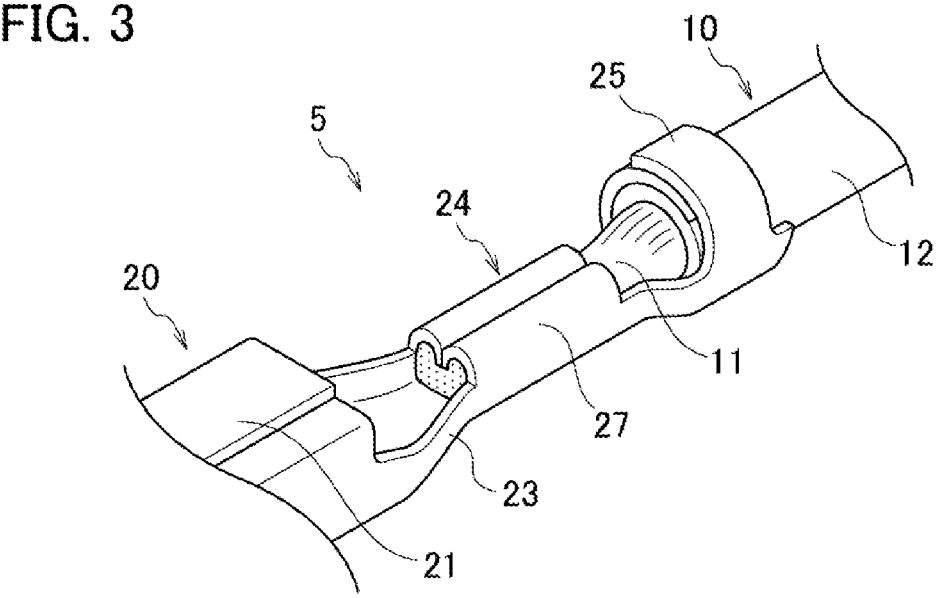
FIG. 3 is a schematic view of the wire with a terminal obtained by the manufacturing method according to the present embodiment for illustrating a state in which the wire is connected to the metal terminal.

In the present embodiment, as illustrated in FIG. 2 and FIG. 3, the terminal portion of the wire 10 is inserted into the wire connection portion 22 of the metal terminal 20. With this, the conductor 11 of the wire 10 is placed on the upper surface of the bottom plate portion 26 of the conductor press-fitting portion 24 in FIG. 2. At the same time, the portion of the wire 10 with the wire covering member 12 is placed on the upper surface of the bottom plate portion 28 of the covering member crimping portion 25 in FIG. 2. After that, the wire connection portion 22 and the terminal portion of the wire 10 are pressed against each other, and thus the conductor press-fitting portion 24 and the covering member crimping portion 25 are deformed and subjected to crimping. Specifically, the pair of conductor crimping pieces 27 of the conductor press-fitting portion 24 are bent inward so as to wrap the conductor 11, thereby crimping the conductor 11 and the upper surface of the bottom plate portion 26 under a close contact state. Moreover, the pair of covering member crimping pieces 29 of the covering member crimping portion 25 are bent inward so as to wrap a part having the wire covering member 12, thereby crimping the wire covering member 12 under a close contact state with the upper surface of the bottom plate portion 28. With this, the metal terminal 20 and the wire 10 are connected to each other under a press-fitted state, and thus the non-sealed wire with a terminal 5 is obtained.

As illustrated in FIG. 1 and FIG. 2, in the present embodiment, the sealing member 30 covers the connection portion 23, the wire connection portion 22, the peripheries of the conductor 11 and the wire covering member 12, which are covered with the wire connection portion 22. Specifically, the sealing member 30 covers a part of the connection portion 23 over the boundary between the conductor press-fitting portion 24 and the distal end of the conductor 11 of the conductor 10, and the sealing member 30 covers and a part of the wire covering member 12 over the boundary between the covering member crimping portion 25 and the wire covering member 12. In the wire with a terminal 1, the sealing member 30 covers the periphery of the conductor 11 and the periphery of the wire covering member 12, which are covered with the wire connection portion 22 as described above. Thus, corrosion of the joint 60 between the conductor 11 and the wire connection portion 22 can be suppressed.

The sealing member 30 is a cured object obtained by irradiating the anti-corrosive material containing the above-mentioned ultraviolet curable resin with ultraviolet light and curing the anti-corrosive material.

Metal having high conductivity may be used as a material of the conductor 11 of the wire 10. Usable materials include copper, a copper alloy, aluminum, and an aluminum alloy. Further, the surface of the conductor 11 may be subjected to tin plating. In recent years, reduction in weight of the wire harness has been demanded. In view of this, aluminum or an aluminum alloy having light weight is preferably used as the conductor 11. For this reason, the conductor 11 preferably includes an elemental wire formed of aluminum or an aluminum alloy.

A resin capable of securing an electric insulation property may be used as a material of the wire covering member 12 configured to cover the conductor 11. For example, a resin containing polyvinyl chloride (PVC) as a main component or an olefin-based resin may be used. Specific examples of the olefin-based resin include polyethylene (PE), polypropylene (PP), an ethylene copolymer, and a propylene copolymer.

Metal having high conductivity may be used as a material (terminal material) of the metal terminal 20. For example, at least one of copper, a copper alloy, stainless steel, copper subjected to tin plating, a copper alloy subjected to tin plating, or stainless steel subjected to tin plating may be used. Further, at least one of copper, a copper alloy, or stainless steel that are subjected to gold plating may be used. Alternatively, at least one of copper, a copper alloy, or stainless steel that are subjected to silver plating may be used. Note that the metal terminal preferably contains copper or a copper alloy.

(Effects of Disclosure)

With the wire with a terminal obtained by the manufacturing method according to the present embodiment, there can be provided the wire with a terminal in which the sealing member having a specific shape is formed only in a required part.

[Method of Manufacturing Wire with Terminal]

Next, the method of manufacturing the wire with a terminal according to the present embodiment is described. The method of manufacturing a wire with a terminal according to the present embodiment is a method that uses a specific manufacturing apparatus for a wire with a terminal.

(Manufacturing Apparatus for Wire with Terminal)

With reference to FIG. 4 to FIG. 9, the manufacturing apparatus for the wire with a terminal is described.

Figure 4:
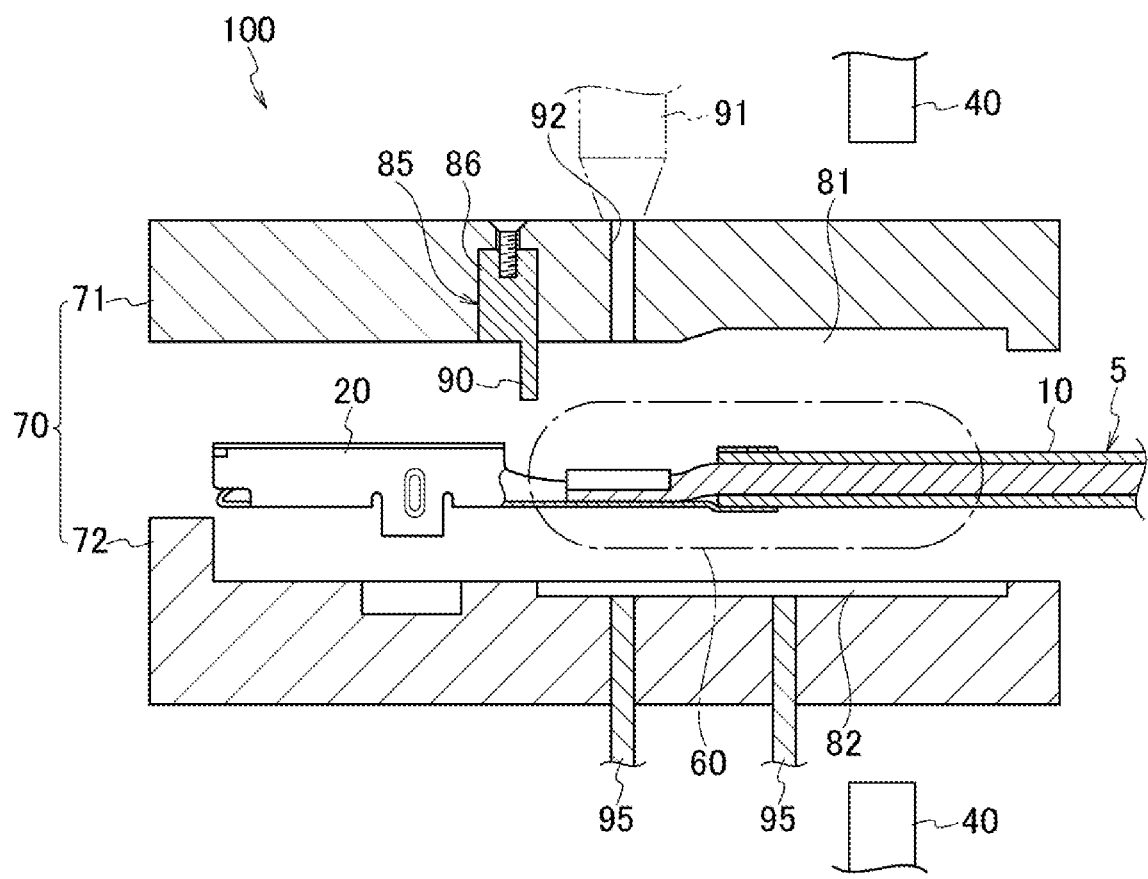
FIG. 4 is a cross-sectional view of a manufacturing apparatus for the wire with a terminal before mold clamping.

FIG. 4 is a cross-sectional view of the manufacturing apparatus for the wire with a terminal before mold clamping. FIG. 5 is a cross-sectional view of the manufacturing apparatus for the wire with a terminal after mold clamping. FIG. 4 is a view illustrating a state in which a first transparent mold member 71 and a second transparent mold member 72 do not overlap with each other. FIG. 5 is a view illustrating a state in which the cavity portion 80 is formed by overlapping the first transparent mold member 71 and the second transparent mold member 72 with each other.

As illustrated in FIG. 5, the manufacturing apparatus 100 for the wire with a terminal 1 includes a transparent mold 70 including the cavity portion 80 that accommodates the joint 60 and allows the anti-corrosive material 35 to be introduced thereinto, and a protruding portion 90 that protrudes from the transparent mold 70 into the cavity portion 80 and restricts flowing of the anti-corrosive material 35. Further, the manufacturing apparatus 100 for the wire with a terminal 1 includes the ultraviolet light irradiation device 40 that irradiates the anti-corrosive material 35 in the cavity portion 80 with ultraviolet light through the transparent mold 70.

<Transparent Mold>

The transparent mold 70 includes the first transparent mold member 71 and the second transparent mold member 72. As illustrated in FIG. 5, in the transparent mold 70, the cavity portion 80 that accommodates the joint 60 therein and allows the anti-corrosive material 35 to be introduced thereinto is formed by overlapping the first transparent mold member 71 and the second transparent mold member 72 with each other.

The cavity portion 80 is formed in the transparent mold 70 so as to secure a clearance 84 between the inner wall surface of the transparent mold 70 and the non-sealed wire with a terminal 5 when the non-sealed wire with a terminal 5 is arranged in the cavity portion 80. Through the clearance 84, the anti-corrosive material 35 can flow.

The first transparent mold member 71 includes a first recessed portion 81 being one recessed portion having a shape obtained by dividing the cavity portion 80 into two parts. The first recessed portion 81 is capable of accommodating a half surface side of the joint 60 of the non-sealed wire with a terminal 5 in the circumferential direction under a state of securing the clearance 84 through which the anti-corrosive material 35 can flow. The second transparent mold member 72 includes a second recessed portion 82 being the other recessed portion having a shape obtained by dividing the cavity portion 80 into two parts. The second recessed portion 82 is capable of accommodating the other half surface side of the joint 60 of the non-sealed wire with a terminal 5 in the circumferential direction under a state of securing the clearance 84 through which the anti-corrosive material 35 can flow.

A resin injection hole 92 is provided in the first transparent mold member 71. The anti-corrosive material 35 is injected through the resin injection hole 92 from the outside of the first transparent mold member 71 into the first recessed portion 81. The anti-corrosive material 35 can be injected into the cavity portion 80 through use of, for example, a nozzle 91 mounted to the resin injection hole 92.

An ejection pin insertion hole is provided in the second transparent mold member 72. An ejection pin 95 can be inserted into the second recessed portion 82 through the ejection pin insertion hole. When the anti-corrosive material 35 is cured in the cavity portion 80, the sealing member 30 is molded on the surface of the joint 60 of the non-sealed wire with a terminal 5, and thus the wire with a terminal 1 is obtained. The wire with a terminal 1 thus obtained is demolded from the second transparent mold member 72 when the ejection pin 95 protrudes into the second recessed portion 82.

The material of the transparent mold 70 is not particularly limited as long as a ultraviolet light transmittance of the transparent mold 70 for ultraviolet light having a wavelength from 10 nm to 400 nm is 50% or more. When the transparent mold 70 has a ultraviolet light transmittance of 50% or more, the anti-corrosive material 35 in the cavity portion 80 can be efficiently irradiated with ultraviolet light emitted from the ultraviolet light irradiation device 40 through the transparent mold 70.

Usable materials for the transparent mold 70 include a transparent resin such as an acrylic resin, a polycarbonate resin, a cyclic polyolefin resin, and a polyvinyl chloride resin and glass such as soda glass, tempered glass, quartz glass, and sapphire glass. Among those examples, an acrylic resin, a polycarbonate resin, a cyclic polyolefin resin, soda glass, and sapphire glass each have a ultraviolet light transmittance of 60% or more, and hence are preferred. Among those, an acrylic resin and a polycarbonate resin are available at a low cost, and hence are preferred more.

The anti-corrosive material 35 contains the ultraviolet curable resin. Thus, when the anti-corrosive material 35 in the cavity portion 80 is irradiated with ultraviolet light through the transparent mold 70, the anti-corrosive material 35 is cured to form the sealing member 30. When the anti-corrosive material 35 is irradiated with ultraviolet light through the transparent mold 70 to form the sealing member 30 as described above, a cooling time, which is required at the time of using a thermosetting resin to form the sealing member 30, is not required. Thus, with the method of manufacturing a wire with a terminal according to the present embodiment, a production speed of the wire with a terminal 1 can be high.

<Protruding Portion>

Figure 7:
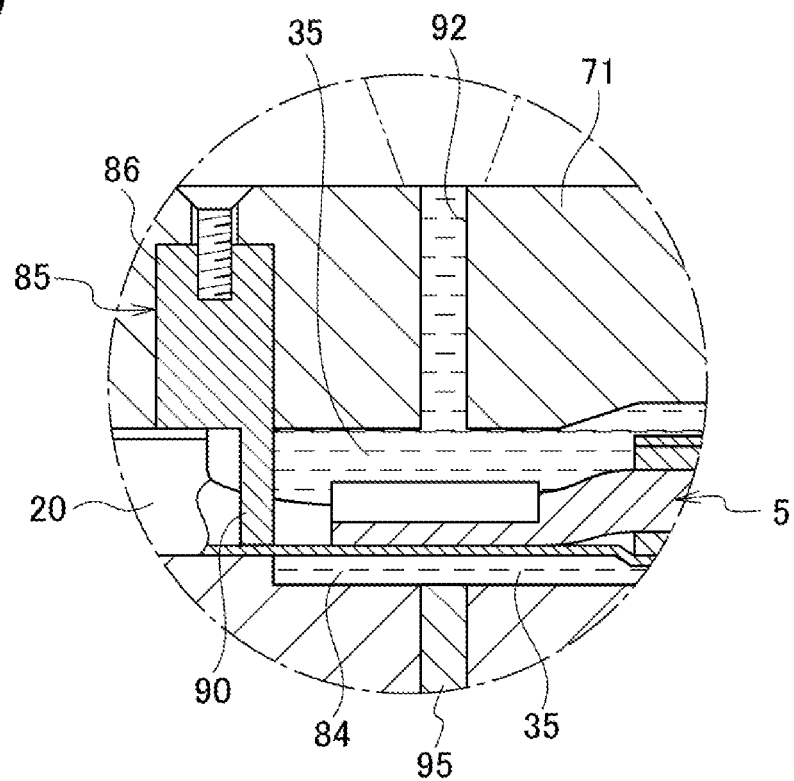
FIG. 7 is an enlarged view of a part D of FIG. 6.

The protruding portion 90 is provided to the first transparent mold member 71 constituting the transparent mold 70. The protruding portion 90 protrudes from the transparent mold 70 into the cavity portion 80, and restricts flowing of the anti-corrosive material 35. FIG. 6 is a cross-sectional view of the manufacturing apparatus for the wire with a terminal at the time of injecting the anti-corrosive material. FIG. 7 is an enlarged view of a part D of FIG. 6. FIG. 6 is a view illustrating a state in which the anti-corrosive material 35 is introduced into the cavity portion 80.

As illustrated in FIG. 4 to FIG. 6, flowing suppressing portion 85 is mounted to a part of the first transparent mold member 71. As illustrated in FIG. 4 to FIG. 7, the flowing suppressing portion 85 includes flowing suppressing base portion 86 that is embedded in the first transparent mold member 71 and is fixed by a bolt, and the protruding portion 90 that protrudes from the flowing suppressing base portion 86 into the first recessed portion 81.

The distal end of the protruding portion 90 protruding into the cavity portion 80 abuts against the connection portion 23 of the non-sealed wire with a terminal 5 placed in the cavity portion 80. With this, the protruding portion 90 prevents the anti-corrosive material 35 from flowing to a lower side with respect to the protruding portion 90 in FIG. 5. In this manner, as illustrated in FIG. 6, the anti-corrosive material 35 injected into the cavity portion 80 exists only in an upper part with respect to the protruding portion 90 in FIG. 6.

Figure 9:
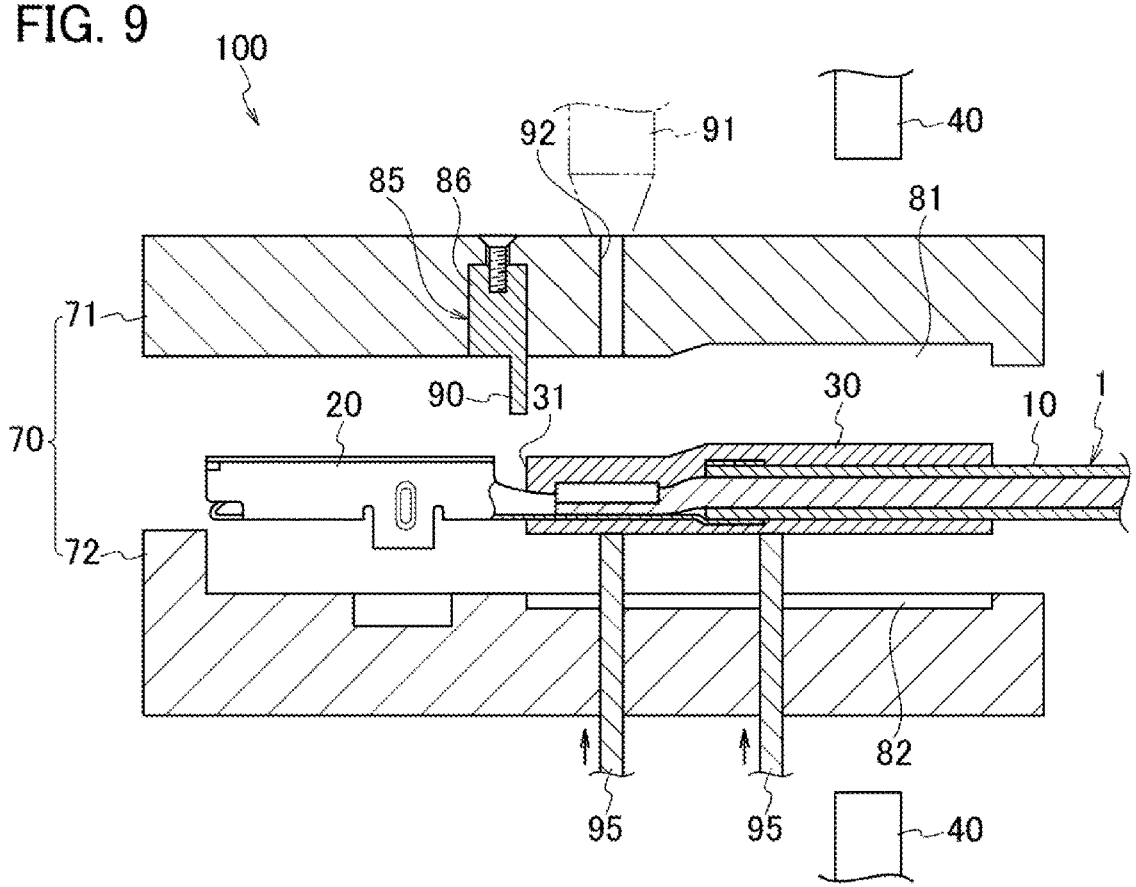
FIG. 9 is a cross-sectional view of the manufacturing apparatus for the wire with a terminal at the time of demolding.

In the method of manufacturing a wire with a terminal according to the present embodiment, the protruding portion 90 is provided. Thus, the anti-corrosive material 35 does not cover the surface of the metal terminal 20, and there is no risk of losing conductivity of the metal terminal 20. Specifically, as illustrated in FIG. 9, when the anti-corrosive material 35 injected into the cavity portion 80 is cured under a state in which the distal end of the protruding portion 90 abuts against the connection portion 23 of the non-sealed wire with a terminal 5, the sealing member 30 is formed only in an upper side with respect to a flat end 31 abutting against the protruding portion 90 in FIG. 9. Meanwhile, the sealing member 30 is not formed on the surface of the metal terminal 20 on a lower side with respect to the flat end 31 in FIG. 9.

The flowing suppressing portion 85 including the protruding portion 90 is removable from the first transparent mold member 71 by removing the bolt fixing the flowing suppressing base portion 86. Specifically, the protruding portion 90 and the transparent mold 70 are separable from each other. In recent years, the wire, the terminal, and the like have been reduced in size. Along with this, the protruding portion 90 is reduced in size, and mechanical strength thereof is degraded. Thus, the protruding portion 90 is easily broken at the time of mold clamping, mold opening, and demolding. In the manufacturing apparatus 100, the flowing suppressing portion 85 including the protruding portion 90 and the transparent mold 70 are separable from each other, and the flowing suppressing portion 85 including the protruding portion 90 is replaceable. Thus, even when the protruding portion 90 is broken in the manufacturing apparatus 100, the protruding portion 90 can be restored immediately by replacing the flowing suppressing portion 85.

The material of the flowing suppressing portion 85 is not particularly limited. However, the material of the flowing suppressing portion 85 is preferably the same as the material of the transparent mold 70, and a ultraviolet light transmittance of the material for ultraviolet light having a wavelength from 10 nm to 400 nm is 50% or more. With this, the anti-corrosive material 35 in the cavity portion 80 is easily photocured.

<Ultraviolet Light Irradiation Device>

The ultraviolet light irradiation device 40 is a member that is provided to the outside of the transparent mold 70 and irradiates the anti-corrosive material 35 with ultraviolet light 42 for photocuring through the transparent mold 70. For example, ultraviolet light having a wavelength from 10 nm to 400 nm is used as the ultraviolet light 42 for photocuring the anti-corrosive material 35. When the ultraviolet light 42 emitted from the ultraviolet light irradiation device 40 reaches the anti-corrosive material 35 in the cavity portion 80 through the transparent mold 70, the anti-corrosive material 35 is photocured to form the sealing member 30.

One or more lamps selected from an LED-type UV irradiation machine, a high-pressure mercury lamp, a metal halide lamp, and an electrodeless discharge lamp may be used in combination as the ultraviolet light irradiation device 40. Among those examples, the LED-type UV irradiation machine is preferred because a producing apparatus 100 can be produced at a low cost. Note that the LED-type UV irradiation machine has an emission wavelength being a single peak wavelength. Thus, photocuring performance may be degraded in some cases depending on a combination with the anti-corrosive material 35. In this case, it is preferred that the ultraviolet light irradiation device 40 in which one or more types of a high-pressure mercury lamp, a metal halide lamp, and an electrodeless discharge lamp are used in combination be used, or it is preferred that such ultraviolet light irradiation device 40 and the LED-type UV irradiation machine be used together.

An irradiation amount and an irradiation time of ultraviolet light may be set appropriately in accordance with a type and a filling amount of the ultraviolet curable resin contained in the anti-corrosive material 35. When the anti-corrosive material 35 in the cavity portion 80 is irradiated with ultraviolet light through use of the ultraviolet light irradiation device 40, the anti-corrosive material 35 can be cured instantaneously. With this, the sealing member 30 that covers the joint 60 between the conductor 11 and the metal terminal 20 and has a shape of the cavity portion 80 can be formed.

In general, the ultraviolet curable resin is known to cause reaction inhibition when being brought into contact with oxygen through curing. Specifically, oxygen in the air reacts with radicals generated by the photopolymerization initiator, and eliminates the radicals. With this, there may be a risk that a polymerization reaction of the ultraviolet curable resin is reduced and curing of the resin is not sufficiently promoted. However, the method of manufacturing a wire with a terminal according to the embodiment is preferred because the anti-corrosive material 35 in the cavity portion 80 and oxygen are less likely to be brought into contact with each other and a risk of curing inhibition as described above is low. Note that the ultraviolet curable resin that is less affected by the oxygen curing inhibition is more preferably used as the anti-corrosive material 35 because a risk of inhibiting a curing process is more suppressed.

The method of manufacturing a wire with a terminal according to the present embodiment is a method including an introducing step and an irradiating step through use of the manufacturing apparatus 100 described above.

(Introducing Step)

The introducing step is a step of arranging, in the cavity portion 80, the non-sealed wire with a terminal 5 that includes the wire 10 and the metal terminal 20 and does not include the sealing member 30 and introducing the anti-corrosive material 35 into the cavity portion 80 under a state in which the protruding portion 90 protrudes into the cavity portion 80.

Specifically, the introducing step includes a mold clamping step and an anti-corrosive material filling step.

<Mold Clamping Step>

The mold clamping step is a step of arranging, in the cavity portion 80, the non-sealed wire with a terminal 5 that includes the wire 10 and the metal terminal 20 and does not include the sealing member 30 and causing the protruding portion 90 to protrude into the cavity portion 80. Specifically, in the mold clamping step, the non-sealed wire with a terminal 5 is arranged in the cavity portion 80 formed by the first recessed portion 81 of the first transparent mold member 71 and the second recessed portion 82 of the second transparent mold member 72, and the first transparent mold member 71 and the second transparent mold member 72 are subjected to mold clamping. At this time, as illustrated in FIG. 5 and FIG. 6, the first transparent mold member 71 and the second transparent mold member 72 are subjected to mold clamping so that the distal end of the protruding portion 90 protruding into the cavity portion 80 abuts against the connection portion 23 of the non-sealed wire with a terminal 5 placed in the cavity portion 80.

The distal end of the protruding portion 90 abuts against the connection portion 23 of the non-sealed wire with a terminal 5 as described above. With this, a substantial space in the cavity portion 80 is limited to a part corresponding to the clearance 84 illustrated in FIG. 6 and FIG. 7. Thus, as illustrated in FIG. 6, in a case where the distal end of the protruding portion 90 abuts against the connection portion 23 of the non-sealed wire with a terminal 5, even when the anti-corrosive material 35 is introduced into the cavity portion 80, the anti-corrosive material 35 is prevented from flowing to the lower side with respect to the protruding portion 90 in FIG. 6.

[Anti-Corrosive Material Filling Step]

The anti-corrosive material filling step is a step of introducing the anti-corrosive material 35 into the cavity portion 80 under a state in which the protruding portion 90 protrudes into the cavity portion 80.

As illustrated in FIG. 6, in the anti-corrosive material filling step, the anti-corrosive material 35 is injected into the cavity portion 80 through use of the nozzle 91 mounted to the resin injection hole 92. The anti-corrosive material 35 introduced into the cavity portion 80 substantially fills only the clearance 84. The anti-corrosive material 35 does not fill the lower part with respect to the protruding portion 90 in FIG. 6 and FIG. 7. Specifically, after the anti-corrosive material filling step, filling of the anti-corrosive material 35 in accordance with the shape of the cavity portion 80 is completed.

(Irradiating Step)

The irradiating step is a step in which the anti-corrosive material 35 in the cavity portion 80 is irradiated with ultraviolet light through the transparent mold 70.

For example, ultraviolet light having a wavelength from 10 nm to 400 nm is used as the ultraviolet light 42 for irradiation. Irradiation intensity and an irradiation time are designed so as to obtain an accumulated amount of the ultraviolet light irradiation amount from 500 to 50,000 mJ/cm$^2$, for example.

FIG. 8 is a cross-sectional view of the manufacturing apparatus for the wire with a terminal at the time of irradiation with ultraviolet light. FIG. 9 is a cross-sectional view of the manufacturing apparatus for the wire with a terminal at the time of demolding.

As illustrated in FIG. 8, when the anti-corrosive material 35 in the cavity portion 80 is irradiated with ultraviolet light through the transparent mold 70, the anti-corrosive material 35 is photocured, and the sealing member 30 that covers the joint 60 between the conductor 11 and the metal terminal 20 and has a shape of the cavity portion 80 is formed. Thus, as illustrated in FIG. 8, when the irradiating step is completed, there can be obtained the wire with a terminal 1 including the wire 10, the metal terminal 20, and the sealing member 30 that covers the joint 60 between the conductor 11 and the metal terminal 20 and is formed by curing the anti-corrosive material 35.

As illustrated in FIG. 9, the wire with a terminal 1 molded in the cavity portion 80 is extruded by using the ejection pin 95, and thus is demolded from the transparent mold 70.

(Cooling Step)

Note that, after the irradiation step, a cooling step for cooling the sealing member 30 may be performed as required. Examples of the method of cooling the sealing member 30 include a cooling method in which air is sent and brought into contact with the sealing member 30, for example. It is preferred to perform the cooling step because stickiness of the surface can be suppressed and adhering of dust and the like can be suppressed.

(Effects of Disclosure)

With the method of manufacturing a wire with a terminal according to the present embodiment, there can be provided the method of manufacturing a wire with a terminal in which the sealing member having a specific shape is formed only in a required part.

In the method of manufacturing a wire with a terminal according to the present embodiment, the anti-corrosive material is cured only through irradiation with light, and thus the sealing member can be obtained. Thus, with the method of manufacturing a wire with a terminal according to the present embodiment, a production speed of the wire with a terminal is high.

When the protruding portion 90 and the transparent mold 70 are separable from each other, maintenance work such as replacement of the protruding portion 90 is facilitated with the method of manufacturing a wire with a terminal according to the present embodiment.

[Wire Harness]

Figure 10:
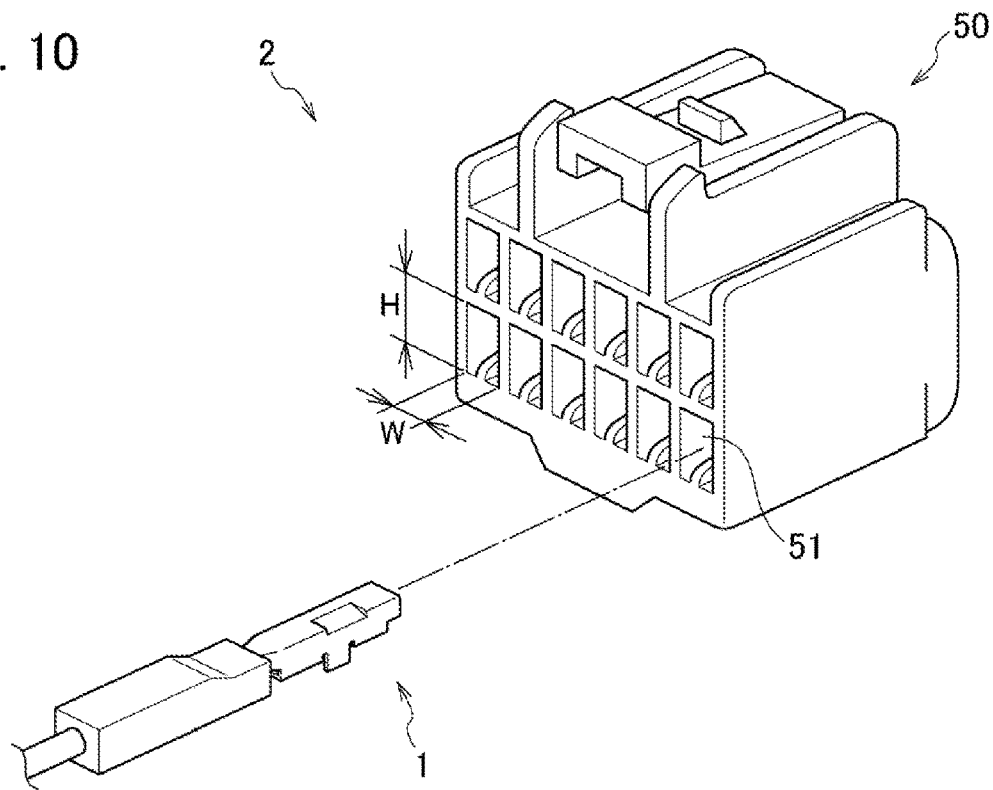
FIG. 10 is a perspective view illustrating a wire harness including the wire with a terminal.

Next, a wire harness including a wire with a terminal is described. The wire harness including a wire with a terminal according to the present embodiment includes the above-mentioned wire with a terminal. Specifically, as illustrated in FIG. 10, a wire harness 2 includes a connector housing 50 and the above-mentioned wire with a terminal 1.

On a front surface side of the connector housing 50, a plurality of mating-side terminal mounting portions (not shown) to which mating terminals (not shown) are mounted are provided. On a back surface side of the connector housing 50, a plurality of cavities 51 are provided. Each of the cavities 51 has a substantially rectangular opening that allows the metal terminal 20 and the sealing member 30 of the wire with a terminal 1 to be mounted therein. Moreover, the opening of each of the cavities 51 is formed to be slightly larger than the cross-section of the metal terminal 20 and the sealing member 30. The metal terminal 20 is mounted to the connector housing 50, and the wire 10 is drawn out from the back surface side of the connector housing 50.

With the wire harness including the wire with a terminal, there can be provided the wire harness including the wire with a terminal in which the sealing member having a specific shape is formed only in a required part.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a wire with a terminal using a manufacturing apparatus, the wire with a terminal comprising: a wire including a conductor and a wire covering member configured to cover the conductor; a metal terminal connected to the conductor of the wire; and a sealing member configured to cover a joint between the conductor and the metal terminal, the sealing member being formed by curing an anti-corrosive material, the method comprising:

providing the anti-corrosive material, the anti-corrosive material including: an ultraviolet curable resin comprising a polymerizable compound including at least one of a photopolymerizable (meth)acrylate monomer or a photopolymerizable (meth)acrylate oligomer, the polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups;

providing the manufacturing apparatus, the manufacturing apparatus comprising: a transparent mold including a cavity portion formed by overlapping a first transparent mold member and a second transparent mold member with each other, the cavity portion configured to accommodate the joint therein and allow the anti-corrosive material to be introduced thereinto; and a protruding portion that protrudes from the transparent mold into the cavity portion and restricts flowing of the anti-corrosive material;

placing in the cavity portion of the transparent mold of the apparatus a non-sealed wire with a terminal including the wire and the metal terminal without the sealing member, and introducing the anti-corrosive material into the cavity portion under a state in which the protruding portion protrudes into the cavity portion; and irradiating the anti-corrosive material in the cavity portion of the transparent mold of the apparatus with ultraviolet light through the transparent mold.

2. The method of manufacturing a wire with a terminal according to claim 1, further comprising removing the wire and the terminal from the transparent mold to form the wire with the terminal and the sealing element, wherein the removing includes separating the protruding portion and the transparent mold from each other.

\* \* \* \* \*